Nov. 17, 1970     C. A. LEIGHTY ET AL     3,541,457

PEAK OCCURRENCE DETECTOR CIRCUIT

Filed Dec. 14, 1966

CLIFFORD A. LEIGHTY
BERNARD J. SULLIVAN
INVENTOR.

BY *Charles C. Krawczyk*

ATTORNEY

3,541,457
PEAK OCCURRENCE DETECTOR CIRCUIT
Clifford A. Leighty, Penfield, and Bernard J. Sullivan, Rochester, N.Y., assignors to Bausch & Lomb Incorporated, Rochester, N.Y., a corporation of New York
Filed Dec. 14, 1966, Ser. No. 601,764
Int. Cl. H03k 17/00
U.S. Cl. 328—150      4 Claims

ABSTRACT OF THE DISCLOSURE

A peak occurrence detector circuit, including a differential amplifier circuit with a nonlinear feedback circuit, adapted to receive an input signal of variable amplitude and provide an output pulse in response to a reversal in the slope of the input signal.

BACKGROUND OF THE INVENTION

Field of the invention

The invention relates to an electrical system including transistors and nonlinear coductors to provide a circuit for determining when a signal has reached a peak amplitude.

Description of the prior art

In various electronic systms it is important to determine the time at which a varying amplitude signal reaches a peak value. For example, in various force sensing apparatus it is important to know when a maximum force has been applied, or in various information-handling systems it is important to know the timing or phase relation between a plurality of signals. Apparatus for providing this desired time relation are generally peak detection circuits that respond to a reversal in the slope of an input signal to provide a sharp timing signal.

In the past, peak occurrence detection circuits generally included double differentiator circuits or amplitude sensing devices that lack high selectively to provide accurate operation. An improved peak detection circuit is disclosed in a U.S. Pat. 2,834,883 granted to Herman Lukoff for a "Peak Amplitude Indicator." This peak occurrence detection circuit overcame some of the disadvantages of the prior art systems but requires a timing signal or a signal synchronized to the input signals to discharge the circuit for repetitive operation. The invention of the present application provides a novel peak detection circuit providing a substantially higher degree of selectivity and accuracy, without requiring discharge pulses for repetitive operation.

SUMMARY OF THE INVENTION

The peak occurrence detection circuit of the invention includes a differential amplifier with inverting and non-inverting input circuits and an output circuit. Input signals to be detected are applied to the noninverting input circuit. A feedback circuit, including a nonlinear circuit means exhibiting a substantially high impedance to current flow in one direction as compared to the impedance to current flow in the opposite direction, is coupled between the output circuit and the inverting circuit. Capacitive means are coupled to the inverting input circuit to charge through the non-linear element to follow the input signal variations in one sense or direction. When the input signal variations change to the opposite sense or direction, an output signal is developed at the output circuit that rapidly reverses in polarity providing an indication that a peak amplitude has been reached.

DESCRIPTION OF THE PREFERRED EMBODIMENTS

Figure 1:
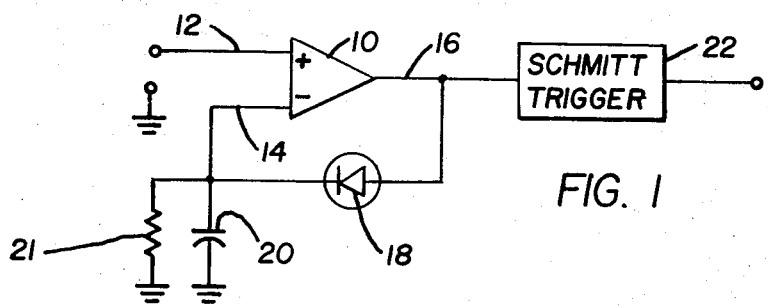
FIG. 1 is a schematic diagram of a first embodiment of a peak occurrence detection circuit in accordance with the principles of the invention.

The peak occurrence detection circuit of FIG. 1 includes a conventional high gain direct current differential amplifier 10 including a first or non-inverting input circuit 12 (+), a second or inverting circuit 14 (−) and an output circuit 16. The differential amplifier 10 is of the type wherein an output signal is developed at the output circuit 16 that is a multiple of the difference in the potentials applied to the first and second input circuits 12 and 14. The signal at the second or inverting input circuit 14 is in effect subtracted from the signal present at the first or noninverting input circuit 12. The gain of the differential amplifier 10 is a function of the required sensitivity of the peak occurrence detector circuit. For example, if a high sensitvity system is desired, the gain of the differential amplifier 10 is selected to be in the order of 100. If a lower sensitivity is desired, the gain of the differential amplifier 10 can be reduced. Of course, it is to be understood, that a higher gain amplifier circuit may be used to increase the circuit sensitvity and is primarily dependent upon the signal to noise ratio of the signal to be peak detected.

A diode 18 is coupled between the output circuit 16 and the second input circuit 14 in a negative feedback circuit. The diode 18 is poled for forward diode current flow when the signal at the output circuit is positive with respect to the signal at the second input circuit 14 and is reversed biased when he polarity reverses. Effectively the diode 18 acts as a nonlinear circuit element exhibiting a low impedance to current flow in one direction (diode forward current) and a substantially higher impedance to the current flow in the opposite direction (reversed biased). A capacitor 20 is coupled between the second input circuit 14 and ground so that the capacitor 20 co-operates with the diode 18 as a signal storage circuit to effectively act as a peak detector circuit. A resistor 21 is connected in shunt with the capacitor 20 to provide a discharge path for the capacitor 20. If the input impedance of the differential amplifier 10 is low enough to provide the desired discharge time constant, the resistor 21 can be eliminated. The output circuit 16 is coupled to a conventional Schmitt trigger circuit 22.

Figure 4:
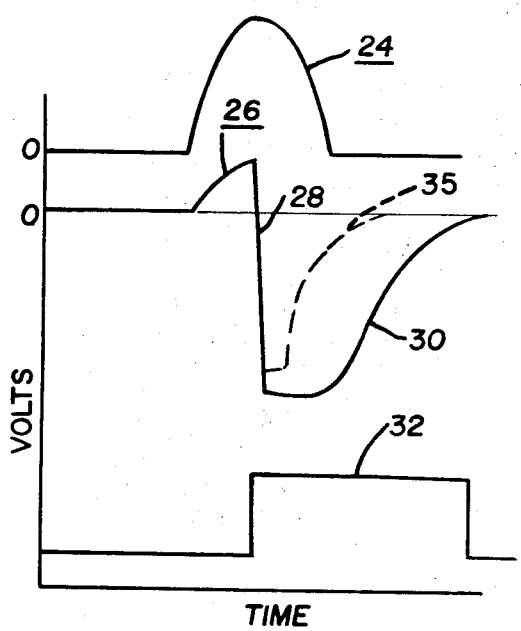
FIG. 4 is a graphical illustration of various signals in the embodiments of FIGS. 1, 2 and 3.

The operation of the peak occurrence detector circuit of FIG. 1 will be explained with reference to FIG. 4. The circuit, as illustrated, is responsive to a positive increasing signal 24 (FIG. 4). As previously mentioned, the same phase relation is maintained between the first or non-inverting input circuit 12 and the output circuit 16. As the input signal 24 increases, a corresponding increase in signal is developed at the output circuit 16 (curve 26 of FIG. 4). Accordingly, the signal at the output circuit 16 causes current to flow in the forward direction of the diode 18 (low impedance) so that the capacitor 20 charges to follow the output circuit signal 26 less the forward voltage drop of the diode 18. As a result, during the positive increasing portion of the curve 24 the gain between the input circuit 12 and the output circuit 16 is approximately unity.

When the input signal 24 reaches its peak and subsequently decreases in amplitude (reverses its slope) the signal in the output circuit 16 also decreases. Since the capacitor 20 is charged to approximately the prior peak value of the input signal 24, a slight decrease in the signal in the output circuit 16 acts to reverse bias the diode 18, thereby opening the negative feedback circuit. Accordingly, the gain between the first or noninverting input circuit 12 and the output circuit 16 equals that of the differential amplifier 10. It should be noted that the slight decrease in the input signal amplitude also effectively reverses the polarity between the difference in the signals applied to the first and second input circuits 12 and 14. This difference signal is amplified by the high gain of the differential amplifier 10 to porduce a sharp negative going slope 28 (limited by the response time of the amplifier 10) that reverses the polarity of the signal at the output circuit 16. When the signal 26 reaches a limiting negative potential, such as amplifier saturation, the signal 26 decreases toward zero volts at a rate determined by the R-C (resistance-capacitance) discharge time of the capacitor 20 and the resistance 21. The sensitivity of the peak occurrence detection circuit is very high. The required reversal in signal level can be approximated as the forward voltage drop of the diode 18 divided by the gain of the differential amplifier circuit 10.

The Schmitt trigger circuit is responsive to a predetermined range of signal levels or polarity to switch from one state to another. When the slope 28 of the curve 26 reaches the predetermined range of signal level the Schmitt trigger switches states to generate an output pulse 32. The leading edge of the pulse 32 provides an accurate indication when the input signal 24 has reached a peak value and subsequently decreased.

Figure 2:
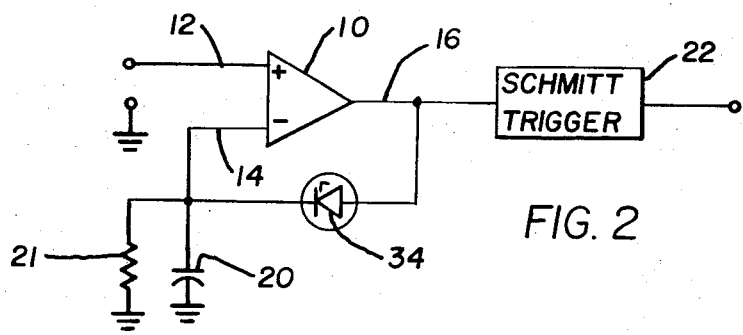
FIG. 2 is a schematic diagram of a second embodiment of a peak occurrence detection circuit in accordance with the principles of the invention.

In the peak occurrence detector circuit of FIG. 2, a Zener diode 34 is connected in the circuit to replace the diode 18. The Zener diode 34 breaks down when the polarity of the signal 26 reverses by a sufficient amount to limit the negative swing and also provides a quicker discharge time of capacitor 20 as illustrated by the dashed curves 35.

Figure 3:
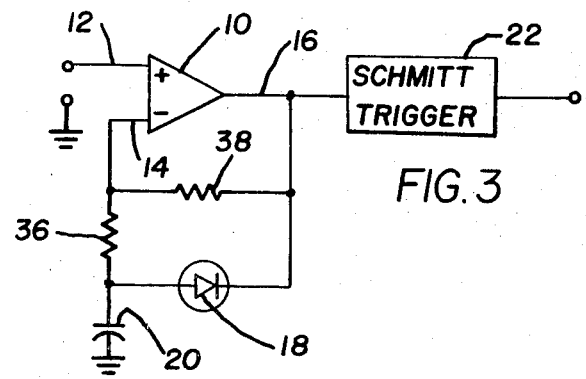
FIG. 3 is a schematic diagram of a third embodiment of a peak occurrence detection circuit in accordance with the principles of the invention.

In the peak occurrence detector circuit of FIG. 3, a resistor 36 is connected in series between the capacitor 20 and the second input circuit 14. The diode 18 in FIG. 3 is connected to be poled in an opposite direction than the diode of FIG. 1 thereby providing a circuit for peak detecting a negative going signal (in contrast to the positive going signal for the circuit of FIG. 1). Feedback resistors 36 and 38 are connected between the output circuit 16 and the second input circuit 14 to provide the desired gain when the diode 18 is reversed biased. The feedback resistors 36 and 38 also provide a discharge path for the capacitor 20 when the signal at the output terminal reverses polarity thereby also reducing the discharge time of the capacitor. If a still quicker discharge time is desired, the diode 18 of FIG. 3 can be replaced by a Zener diode to provide the breakdown effect previously covered with respect to the circuit of FIG. 2.

It should be noted that the peak occurrence detector circuits of FIGS. 1, 2, and 3 will also function to detect the peak of input signal although the capacitor 20 is not fully discharged, as long as the input signal has a peak amplitude greater than the charge present on the capacitor 20 at the time the peak is reached.

What is claimed is:

1. A peak occurrence detector circuit comprising:
 a first differential amplifier circuit including a first input circuit for receiving a varying amplitude input signal, a second input circuit and an output circuit;
 capacitive circuit means for storing a signal corresponding to the input signal amplitude variations in one sense, said capacitive circuit means connected to said second input circuit; and
 nonlinear circuit means including a Zener diode having a relatively high impedance to current flow in one direction as compared to the impedance to current flow in the opposite direction, said non-linear circuit comprising a negative feedback circuit coupling said second input circuit and said output circuit, said output circuit thereby generating an output signal in response to a change in input signal amplitude sense.

2. A peak occurrence detector circuit comprising:
 a first differential amplifier circuit including a first input circuit for receiving a direct current input signal of increasing and subsequently decreasing amplitude, a second input circuit and an output circuit;
 capacitive circuit means for storing a signal corresponding to the input signal amplitude variations in one sense, said capacitive circuit means connected to said second input circuit; and
 nonlinear circuit means including a Zener diode having a relatively high impedance to current flow in one direction as compared to the impedance to current flow in the opposite direction and connected for easy current flow to charge said capacitive circuit means corresponding to the increasing input signal and for breakdown current flow to discharge said capacitive circuit means, said non-linear circuit comprising a negative feedback circuit coupling said second input circuit and said output circuit, said output circuit thereby generating an output signal in response to a change in input signal amplitude sense.

3. A peak occurrence detector circuit comprising:
 a first differential amplifier circuit including a first input circuit for receiving a varying amplitude input signal, a second input circuit and an output circuit;
 capacitive circuit means for storing a signal corresponding to the input signal amplitude variations in one sense, said capacitive circuit means connected to said second input circuit;
 nonlinear circuit means including a diode having a relatively high impedance to current flow in one direction as compared to the impedance to current flow in the opposite direction, said nonlinear circuit comprising a negative feedback circuit coupling said second input circuit and said output circuit, said output circuit thereby generating an output signal in response to a change in input signal amplitude sense;
 a first resistive means coupling said capacitive circuit means to said second input circuit in a series circuit; and
 a second resistive means coupled between said output circuit and said second input circuit whereby the gain between said first input circuit and said output circuit is controlled by said diode and said first resistive means when said diode is conducting in the forward direction and by the second resistive means when said diode is cut off.

4. A peak occurrence detector circuit comprising:
 a direct current differential amplifier having a noninverting input circuit for receiving a direct current input signal having an increasing amplitude and a subsequently decreasing amplitude and an inverting input circuit and an output circuit;
 a capacitor connected between a point of reference potential and said inverting input circuit;
 a diode connected between said output circuit and said inverting input circuit in a negative feedback circuit with the diode connected for easy current flow from said output circuit to charge said capacitor whereby a signal is developed at said output circuit that follows the increasing amplitude input signal and reverses in polarity when the input signal decreases in amplitude; and
 trigger circuit means coupled to said output circuit for developing a sharp pulse type signal when the voltage at said output circuit reverses in polarity.

References Cited

UNITED STATES PATENTS

| | | | |
|---|---|---|---|
| 3,213,293 | 10/1965 | Finlon et al. | 307—235 |
| 3,259,760 | 7/1966 | Morey et al. | 324—103 X |
| 3,287,570 | 11/1966 | Wilson | 307—235 |
| 3,302,034 | 1/1967 | Nowell | 307—235 |

OTHER REFERENCES

IBM Technical Disclosure Bulletin, vol. 9, No. 4, September 1966, filed in 307/235.

DONALD D. FORRER, Primary Examiner

R. C. WOODBRIDGE, Assistant Examiner

U.S. Cl. X.R.

307—235; 324—103, 124; 328—151; 330—30